United States Patent [19]

Harmer et al.

[11] Patent Number: 5,061,294

[45] Date of Patent: Oct. 29, 1991

[54] ABRASIVE ARTICLE WITH CONDUCTIVE, DOPED, CONJUGATED, POLYMER COAT AND METHOD OF MAKING SAME

[75] Inventors: Walter L. Harmer, Arden Hills; Leif Christensen, St. Paul; Gary J. Drtina, Woodbury; Harvey J. Helmin, Golden Valley, all of Minn.

[73] Assignee: Minnesota Mining and Manufacturing Company, St. Paul, Minn.

[21] Appl. No.: 587,606

[22] Filed: Sep. 24, 1990

Related U.S. Application Data

[63] Continuation-in-part of Ser. No. 352,734, May 15, 1989, abandoned.

[51] Int. Cl.$^5$ .................. E02D 27/00; H01B 1/06
[52] U.S. Cl. .................... 51/295; 51/293; 427/385.5; 427/196; 427/407.1; 427/421; 252/500; 252/512; 252/518; 252/519; 428/325; 428/327; 428/328; 428/329

[58] Field of Search .............. 252/506, 512, 518, 519; 427/385.5, 389.9, 412.1, 407.1, 420, 421, 196, 393.5, 397; 51/295, 293, 298, 309, DIG. 19, DIG. 22; 428/325, 327, 328, 329

[56] References Cited

U.S. PATENT DOCUMENTS

| | | | |
|---|---|---|---|
| 3,942,959 | 3/1976 | Markoo et al. | 51/295 |
| 3,992,178 | 11/1976 | Markoo et al. | 51/295 |
| 4,412,942 | 11/1983 | Naarmann et al. | 252/518 |
| 4,567,250 | 1/1986 | Naarmann et al. | 252/500 |
| 4,587,037 | 5/1986 | Münstedt et al. | 252/518 |
| 4,691,005 | 9/1987 | Sato et al. | 252/500 |
| 4,751,138 | 6/1988 | Lumey et al. | 51/295 |
| 4,765,928 | 8/1988 | Shakier | 252/518 |
| 4,767,644 | 8/1988 | Yamaguchi et al. | 51/295 |
| 4,776,863 | 10/1988 | Vanden Berg et al. | 51/295 |
| 4,826,508 | 5/1989 | Schwartz et al. | 51/295 |

*Primary Examiner*—Josephine Barr
*Attorney, Agent, or Firm*—Gary L. Griswold; Walter N. Kirn; Richard Francis

[57] ABSTRACT

Coated abrasive product contains a conductive, doped, conjugated polymer to reduce the static charge generated during abrading operations.

13 Claims, No Drawings

ABRASIVE ARTICLE WITH CONDUCTIVE, DOPED, CONJUGATED, POLYMER COAT AND METHOD OF MAKING SAME

REFERENCE TO PRIOR APPLICATION

This application is a continuation-in-part of application Ser. No. 07/352,734, filed May 15, 1989, now abandoned.

FIELD OF THE INVENTION

This invention pertains to loading-resistant abrasive products such as coated abrasive products and a method of making the same.

BACKGROUND ART

Coated abrasives, considered the premier tool for abrading and finishing wood and wood-like materials, unfortunately suffer from two major problems associated with their use, loading and static electricity. Loading is the term used to describe the filling of the spaces between abrasive granules with swarf (the material removed from the workpiece) and the subsequent build-up of that material. In wood sanding, sawdust particles are lodged in between abrasive grains, dramatically reducing the cutting ability of the grains and often resulting in burning of the surface of the wood workpiece. Burning, of course, severely damages the workpiece.

A major cause of loading is the build-up of an unwanted electrical charge during belt sanding. This electrical charge or static electricity is generated by the constant interaction of the endless coated abrasive belt, the wood workpiece and the back support for the endless belt. This static charge is typically on the order of 50 to 100 kilovolts.

Static electricity is also responsible for numerous other problems. A sudden discharge of the accumulated static charge can cause serious injury to an operator and ignition of dust particles, thereby posing a serious threat of fire or explosion. The static charge also causes the sawdust to cling to various surfaces including that of the coated abrasive and the wood workpiece thereby making it difficult to remove by use of a conventional exhaust system.

If the electrical charge is reduced or eliminated, the coated abrasive will have a significantly longer use life, produce a finer surface finish on the workpiece and eliminate or reduce the potential for the above-mentioned hazards.

Many solutions, with varying degrees of success, have been attempted to solve the loading and static electricity problems. One solution is to apply a size or supersize coat of low energy surface material onto the abrasive surface. U.S. Pat. No. 2,768,886 (Twombly) discloses the use of an unfused surface coating of a metal soap such as a metal stearate or palmitate on a coated abrasive to reduce the loading. U.S. Pat. No. 2,881,064 (Rankin et al) discloses the use of an organo silicon based supersize coating to prevent loading. U.S. Pat. No. 3,042,508 (Hagis et al) discloses a metal backed-abrader having a superposed coating of fluoroethylene polymer to reduce loading. U.S. Pat. No, 3,043,673 (Klein et al) teaches the use of an oxy-containing compound selected from aliphatic polyhydric alcohols or aliphatic polyethers blended into the phenolic based size resin. U.S. Pat. No. 3,795,496 (Greenwood) describes a coated abrasive containing plasticized polyvinyl acetate supersize coating to prevent loading. U.S. Pat. No. 4,396,403 (Ibrahim) describes a loading resistant coated abrasive made without the need of a supersize coat having a size coat comprised of a mixture of phosphoric acids, partial esters of such acids, amine salts of such acids and partial esters, and/or quarternary ammonium salts with at least one long substituent group and amino resins or glue sizing resin.

Another solution to the loading problem is to incorporate a conductive or an antistatic material into the coated abrasive construction to eliminate the accumulation of electrical charge. U.S. Pat. No. 3,942,959 (Markoo et al) discloses a coated abrasive construction having an inner conductive layer which has been made conductive by the addition of conductive filler sandwiched between two nonconductive resin layers to prevent the accumulation of electrostatic charge during grinding. The conductive filler may be a metal alloy, metal pigment, metal salt or metal complex. U.S. Pat. No. 3,992,178 (Markoo et al) teaches a coated abrasive containing an outer layer containing graphite particles in a bonding resin which reduces the electrostatic charges generated during grinding.

Although the above references may produce coated abrasive products which have a lessened tendency to load, there is still considerable room for improvement.

SUMMARY OF THE INVENTION

This invention provides a coated abrasive product which contains conductive, doped, conjugated polymer to reduce the static electrical charge resulting from abrading operations. A coated abrasive typically comprises a support member (such as a sheet of paper or cloth) having a front surface and a back surface, abrasive granules and a bond system to secure the abrasive granules to the front surface of the support member. The conductive, doped, conjugated polymer may be present as a supersize coating or as a coating on the front or back side of the support member of the coated abrasive. A "supersize coating" as herein used means a coating immediately over the resin size coat of the abrasive face of the coated abrasive product. The supersize coating may be the top coating or outer coating to the coated abrasive product but it is preferably immediately beneath the top coating or outer coating with the top coating being a "free coating". The free coating can be of any binder-like material which serves to protect the conductive, doped, conjugated polymer. Examples of such binder-like materials include: urea-formaldehyde resins, melamine-formaldehyde resins, phenolic resins, epoxy resins and metal stearates.

It is preferred that the conductive, doped, conjugated polymer layer be on the back side of the backing of the coated abrasive since a coating of such a polymer on the front side of the binder layer may diminish abrasive performance. It is also more convenient to add such a polymer coating to the backside of any of a variety of standard coated abrasives without altering their abrasive properties.

The reduced charge build-up is manifested by a decreased tendency of the abrasive product of the invention to load with particles generated from abrading operations, a reduction in the static electricity generated from abrading operations and an increased cut rate.

More specifically, the present invention provides an improved abrasive article comprising:

(a) a support member having a front surface and a back surface;

(b) abrasive granules;

(c) a bond system which serves to secure the abrasive granules to the front surface of the support member in an abrasive coating having an abrasive surface;

the improvement comprising a conductive, doped, conjugated polymer layer over at least one of said abrasive surface, said front surface or said back surface, said polymer being contained in said layer in an amount sufficient to reduce static electrical charge resulting from abrading operations, provided if the polymer of said conductive, doped, conjugated, polymer layer is acidic the support member surface upon which it may be applied is selected so that it will not be degraded by the presence of acid.

The preferred conjugated polymers are polypyrrole and polyaniline or substituted versions thereof. The preferred dopants for polypyrrole are p-toluene sulfonate, chloride ion, or ferric tetrachloride. The preferred dopant for polyaniline is sulfate or chloride ion.

The conductive, doped, conjugated polymer is employed as a supersize or backing coating, preferably at a coating thickness of less than about 0.05 millimeter. It is also contemplated to have multiple coatings of the same or different conductive conjugated polymers. It has been found that such a thin coating quite unexpectedly significantly reduces static electricity build up throughout the entire useful life of the coated abrasive product. By contrast, previous anti-loading coatings were required to be much thicker.

DETAILED DESCRIPTION

Most organic polymers are not considered conductive since they lack charge carriers which are necessary to transport electrons. Most organic conjugated polymers are similarly considered to be insulators; however, certain conjugated polymers can be rendered electrically conductive through the process of redox doping. A conjugated polymer is defined as an organic material having alternating double and single bonds. For example, polyacetylene (which can be obtained by polymerizing acetylene) is comprised of conjugated ethylene units. A conjugated polymer can also include heteroatoms as in poly(p-phenylene sulfide) where a "lone pair" of electrons on the sulfur atom assures uninterrupted conjugation.

Examples of conjugated polymers useful in the practice of the present invention include polythiopene, polyaniline, polypyrrole, polyacetylene, poly(p-phenylene), poly(p-phenylenevinylene), poly(p-phenylene sulfide), polyfuran, polycarbazole, polyisothianaphthene, polyisoindole, polyquinoline, polyazulene, copolymers, mixtures or substituted versions thereof and crosslinked versions thereof.

The process of redox doping involves reduction or oxidation of the conjugated polymer, generating charged sites along the polymer backbone in the form of ion radicals, ions or diions. Often such charged sites, or carriers, are also known by those skilled in the art as "solitons", "polarons", or "bipolarons". The charged carriers are neutralized by the incorporation into the polymer network of counterions called dopants. A polymer which undergoes this transformation is referred to as a "doped" polymer. It is speculated that the electronic conductivity in a doped polymer is due to the movement of the charged carriers along the polymer backbone, and to interchain hopping of charges. The counterions, or dopants, merely serve to maintain electrical neutrality, and have limited mobility within the polymer matrix.

The conductivity of the polymer is a function of the dopant selected, the dopant concentration, molecular weight of the polymer, polydispersity of the polymer, any polymer chain branching, polymer crystallinity and morphology, and polymer processing. Knowledge of the actual degree of conductivity of the conjugated polymer is relatively unimportant as long as it is able to reduce the static electrical charge build-up in the coated abrasive of the invention. A further understanding of the theory of conjugated, doped polymers may be found by referring to the *Handbook of Conducting Polymers*, Vol. I and II, Skotheim ed., Marcel Dekker, 1986. The mechanism by which the polymer is rendered conductive is unimportant to the practice of the present invention.

The redox agents used in the doping process can vary within wide limits. Generally, the agents must show low nucleophilic or electrophilic reactivities, and be of sufficient redox power to reduce or oxidize the neutral polymer, thus rendering it electronically conductive.

Three types of doping are possible: p, n and self. In p type doping, the dopant is anionic and stabilizes a positive charge generated on the polymer backbone. Examples of redox agents useful in p type doping include salts of a strong cationic oxidant in combination with a non nucleophilic anion. The strong cationic oxidant can include, but is not limited to, Fe(III), Cu(II), Ce(IV), Cr(VI), Co(III), Ag(II), $NO^+$ and trityl. The anion in combination with the cationic oxidant can include, but is not limited to, sulfate, bisulfate, perchlorate, fluoroborate, hexafluorophosphate, organic sulfonates, and halides. Other examples of redox agents useful in p type doping include halogens, arsenic pentafluoride, antimony pentafluoride, iodine pentafluoride, persulfate ion in combination with a suitable cation or hydrogen peroxide in combination with a strong acid. In n type doping, the dopant is cationic and stabilizes a negative charge generated on the polymer backbone. In both the p and n type doping, the dopant ion is not very mobile within the polymer. Examples of redox agents useful in n type doping include alkali metals, carbanions associated with alkali metal cations and alkyllithium compounds. In the self doped case, which can be either n or p type, a non-reactive ion is covalently bound to the conjugated polymer chain and the bound ion serves as the dopant ion. One skilled in the art can determine which redox agents are most suitable with a particular conjugated polymer.

The conductive, doped, conjugated polymer coating of this invention can be formed by several different methods which are detailed below. In one embodiment a preformed, neutral, conjugated polymer coating or film can be exposed to a suitable redox agent thus transforming the polymer into its doped form. For example, a thin coating of polyacetylene, e.g., formed by polymerizing acetylene, will become conductive upon exposure to arsenic pentafluoride.

A conductive polymer which is soluble in its neutral or doped form may be coated from solution onto a coated abrasive surface. Examples of such polymers include poly(3-alkyl thiophenes), and the self-doped poly(3-thiophenebeta- alkylsulfonates).

Some conductive polymers are conveniently formed as a coating, directly in their doped form, via oxidative polymerization of suitable monomers. Examples of monomers that undergo this type of polymerization and doping include pyrrole, thiophene, 2,2'-bithiophene, furan, aniline, isothianaphthene, isoindole and substituted versions and mixtures thereof. This is the preferred embodiment of this invention. The reaction is carried out on the surface of the abrasive article. For convenience the coated abrasive article is spray coated with a solution of the monomer and oxidant, applied in either order. The oxidant employed is often in the form of a metal salt, where the metal cation is in a high oxidation state associated with a non-nucleophilic anion. The non-nucleophilic anion becomes the dopant. Useful metal cations include, but are not limited to, Fe(III), Cu(II), Ce(IV), Cr(VI), Co(III), and Ag(II). Non metallic cations that are strong oxidants, and thus useful in the practice of the present invention, include $NO^+$ and trityl. Useful anions in combination with the above cations include, but are not limited to, sulfate, perchlorate, fluoroborate, hexafluorophosphate, hexafluoroantimonate, hexafluoroarsenate, trifluoroacetate, organic sulfonates, and halides such as chloride or fluoride. Halogens are also useful as oxidants. An example of a strong anionic oxidant useful for this invention is persulfate, conveniently employed as the ammonium or alkalimetal salt.

Alternatively, the dopant can be incorporated via the purposeful addition of a non-nucleophilic anion to the redox reaction. For example, oxidation of pyrrole with hydrogen peroxide in fluoroboric acid results in the formation of polypyrrole doped with fluoroborate.

A preferred conductive polymer is polypyrrole generated with ferric chloride as a redox agent. Another preferred conductive polymer is polyaniline generated from dilute hydrochloride acid with ammonium persulfate as the redox agent. The aniline polymerizes to chloride or sulfate doped polyaniline thereby becoming conductive. The conductive supersize coating may be formed by coating pyrrole monomer on the abrasive face of a coated abrasive followed by a coating of ferric chloride. The pyrrole polymerizes to ferric tetrachloride or chloride doped polypyrrole thereby becoming conductive. One method of applying a conductive pyrrole polymer layer to a substrate is disclosed in U.S. Pat. No. 4,696,835 (Mans et al).

The most preferred method for applying the monomer and the redox agent is to simultaneously spray these components in a converging stream onto sized or unsized backing or onto the abrasive surface of the coated abrasive. It has been found that this produces quite unexpectedly a conductive, doped, conjugated polymer having a high degree of conductivity, i.e., a much lower surface resistivity. The solutions of the monomer and redox agent may also be sprayed at the same time in separate streams. It is not recommended to first apply the redox agent solution to the coated abrasive surface, remove the solvent and then apply the monomer since this method allows the redox agent to penetrate into the backing. Some redox agents such as ferric chloride can degrade the backing over time. If the redox agent and the monomer are applied at about the same time, redox agent penetration into the backing and backing degradation can be avoided.

It is also preferred to add a wetting agent to the monomer and redox agent formulations for ease of coating. A useful wetting agent is a liquid, halogenated, hydrocarbon surfactant material such as that having the trade identification FC-170 which is commercially available from Minnesota Mining and Manufacturing (3M) Company.

If the oxidant used to make the conductive doped conjugated polymer is acidic, or if the conductive polymer is acidic, care must be taken when these materials are coated directly on a cellulosic backing. This is especially important when acidic components are used in a presize. Acidic materials may degrade a cellulosic backing such as paper or cotton cloth. In such case it is preferred that the cellulosic backing first be sealed so that the acidic materials cannot penetrate into the backing. The backing can be sealed for example by an acrylic latex coating.

Additionally, some of the conductive polymers formed from the monomers and oxidants may not be completely stable at elevated temperatures for extended periods of time. This is important if the conductive polymer is a presize for a coated abrasive having a phenolic make and/or size coat. The phenolic resins typically require an elevated temperature, e.g., about 90° C. to 100° C., for at least 5, and usually 10 hours to polymerize or cure. Some of the conductive polymers may not be completely stable under these conditions and care should thus be taken during the selection of the monomer and/or oxidant. For example, it is preferred to use ferric tosylate as an oxidant instead of ferric chloride, since ferric tosylate doped conductive polymers are more stable at elevated temperatures for extended periods of time. The thermal stability of the materials is usually not a concern, however, if the conductive polymer is a backsize or a supersize since the backsize and supersize are applied after the make and size have been cured.

The coated abrasives of the invention are, except for the conductive polymer coating, typically constructed with a substrate backing, abrasive grain, and a bonding system which operates to secure the abrasive grains to the backing. The backing is most commonly coated with a first layer of adhesive, often referred to as a "make coat", and then abrasive grains are applied. If the conductive polymer is applied to the front side of the backing, it is applied prior to application of the make coat and then the make coat is applied. The adherence of the resulting adhesive/abrasive composite is then generally solidified or set sufficiently to retain the abrasive grains to the backing, so that a second layer of adhesive, often referred to as a "size coat", can be applied. The size coat further reinforces the coated abrasive product. The conductive, doped, conjugated polymer "supersize coat", if applied to the abrasive surface, is then applied over the solidified size coat. An optional additional overcoating which may contain a grinding aid or other well known additives, can be applied over the conductive supersize coating. Once the final coat is solidified the resulting coated abrasive product can be converted into a variety of convenient forms of various uses, for example sheets, rolls, belts and discs.

The conventional components forming the coated abrasive product of the invention may be selected from those typically used in this art. The backing may be formed of paper, cloth, vulcanized fiber, polymeric film or any other backing material known or which becomes available for this use. The abrasive granules may be any conventional grade utilized in the formation of coated abrasives and may be formed of flint, garnet, aluminum oxide, ceramic aluminum oxide, alumina zirconia, diamond and silicon carbide, etc., or mixtures thereof. The frequency of the abrasive granules on the sheet will also be conventional. The abrasive granule may be oriented or may be applied to the backing without orientation, depending upon the requirements of the particular coated abrasive product. The bond system, which serves to secure the abrasive granules to the backing, may be formed from phenolic resins, epoxy resins, acrylate resins, urea-formaldehyde resins, melamine-formaldehyde resins, glues or mixtures thereof. The bond system may also include other additives well known in the art such as fillers, grinding aids, coupling agents, dyes, wetting agents or surfactants.

It is preferable that another coating (called a free coating) be applied over the conductive, doped, conjugated polymer coat. It is theorized that this additional coating insulates the doped, conjugated polymer which results in enhancing the conductive nature of the conductive, doped, conjugated polymer. Examples of such coatings include a release agent such as a metal stearate, e.g., zinc stearate and calcium stearate, and a resin bond such as urea-formaldehyde, melamine-formaldehyde, phenol-formaldehyde, or epoxy resin.

The coated abrasive product of the invention may also include such other modifications as are known in this art. For example, a back coating such as pressure-sensitive adhesive may be applied to the nonabrasive side of the construction.

It is also contemplated that the conductive, doped, conjugated polymer can be utilized in a non-woven abrasive product. Non-woven abrasive products typically include an open, porous, lofty, polymer filament structure having abrasive granules distributed throughout the structure and adherently bonded therein by an adhesive material. The method of making such non-woven abrasive products is well known.

EXAMPLES

The following non-limiting examples will further illustrate the invention. All parts, percentages and weight ratios described in the examples are by weight unless otherwise stated.

Testing

The following tests were used in conjunction with the examples:

Wood Belt Test

The coated abrasive sheet material was converted into 7.6 cm by 356 cm endless belts. The belts were installed on a constant load surface grinder, abrading a 5 cm by 28 cm surface of a fir end grain wood workpiece. The belt traversed at 1000 surface meters per minute at an interface pressure of approximately 23 grams/cm$^2$. Six separate boards were sanded for five minutes each. The test endpoint was thirty minutes. The coated abrasive belts were weighed before and after testing. This weight difference corresponds to the amount of loading, that being the amount of wood particles loaded or collected on the coated abrasive surface.

Surface Resistivity

Prior to abrading, the surface resistivity of the outermost surface of the coated abrasive was measured for each coated abrasive belt. Surface resistivity (the inverse of conductivity) is a measure of conductivity. In general, as the conductivity of the product increases, the loading and the resistivity decrease. The resistivity was measured using an ohmmeter purchased from Fluke, Model 8020B. The ohmmeter probes were placed 1.3 cm apart and 6 to 12 measurements were taken with the average of these being reported.

Stroke Sander Test I

The coated abrasive material was converted into a 16 cm by 762 cm endless coated abrasive belt. The belts were then installed on a Oakley stroke sander which abraded the 5 cm by 10 cm face of six 5 cm by 31 cm by 10 cm Ponderosa pine boards for five minutes each. The pressure at the interface was 35 grams/square cm. The test endpoint was 30 minutes at which point standing was discontinued and the total amount of pine abraded or cut was calculated.

Stroke Sander Test II

The coated abrasive material was converted into a 16 cm by 762 endless coated abrasive belt. The belts were then installed on an Oakley stroke sander which abraded the 5 cm by 10 cm face four 5 cm by 31 cm by 10 cm red oak boards for five minutes each. The pressure at the interface was 35 grams/square cm. For each coated abrasive belt, the sawdust accumulation generated during abrading was measured. A test coated abrasive product was considered to be antistatic if there was a low accumulation of sawdust as a result of this abrading test.

EXAMPLES 1–7

Examples 1–7 compare the performance of a coated abrasive product having a supersize coating which includes various combinations of ferric chloride and pyrrole to provide a conductive polymer.

EXAMPLE 1

A ferric chloride solution was prepared by mixing 10% anhydrous ferric chloride and 90% ethanol. This solution was then applied to a grade P120 Imperial Resin Bond F weight paper backed coated abrasive belt, commercially available from the Minnesota Mining and Manufacturing (3M) Company. A solution (10% pyrrole, 20% toluene and 70% hexane) was sprayed over the dried ferric chloride coating, causing the pyrrole to rapidly polymerize to form a thin, solid coating of a doped conjugated polymer. The weight ratio of the two solutions was 1 to 1 with approximately 8.2 grams/square meter of ferric chloride and pyrrole being added to the coated abrasive. The coated abrasive was then tested for surface resistivity by the Surface Resistivity Test and loading by the Wood Belt Test. The test results can be found in Table I.

EXAMPLE 2

A coated abrasive was prepared and tested in the same manner as Example 1, except the weight ratio of FeCl$_3$ to pyrrole was 2 to 1 and the coating weight was 9.4 grams/square meter.

EXAMPLE 3

A coated abrasive was prepared and tested in the same manner as Example 1, except the ratio of FeCl$_3$ to pyrrole was 1 to 2 and the coating weight was 9 grams/square meter.

EXAMPLE 4

A coated abrasive was prepared and tested in the same manner as Example 1, except the coating weight was 11.3 grams/square meter.

EXAMPLE 5

A coated abrasive was prepared and tested in the same manner as Example 1, except that the pyrrole solution was sprayed immediately after the ferric chloride, without first drying the latter. The coating weight was 7.8 grams/square meter.

EXAMPLE 6

A coated abrasive was prepared and tested in the same manner as Example 1, except that the ferric chloride solution and the pyrrole solution were sprayed simultaneously in a converging stream. The coating weight was 6.8 grams/square meter.

EXAMPLE 7

A coated abrasive was prepared and tested in the same manner as Example 6, except that the coating weight was 9.7 grams/square meter.

TABLE I

| Example | Surface Resistivity (K ohm at 1.3 cm) | Belt Loading (grams) |
| --- | --- | --- |
| Control A[1] | >20,000 | 0.9 |
| Control B[2] | >20,000 | 0.8 |
| Control C[3] | 20-30 | 0.2 |
| 1 | 40-60 | 0.5 |
| 2 | 20-40 | 0.2 |
| 3 | 25-50 | 0.2 |
| 4 | 15-30 | 0.2 |
| 5 | 10-20 | 0.1 |
| 6 | 10-40 | 0.1 |
| 7 | 5-10 | 0.1 |

[1]Control A was a grade 120 Imperial Resin Bond coated abrasive having an F weight paper backing, the coated abrasive being commercially available from the 3M Company, St. Paul, Minnesota.
[2]Control B was a grade P120 Imperial Resin Bond coated abrasive having an open coat and an F weight paper backing, the coated abrasive being commercially available from the 3M Company, St. Paul, Minnesota.
[3]Control C was a grade P120 Ekamant EKM Antistatex coated abrasive commercially available from Ekamant. This product is considered in the art to be an antistatic coated abrasive product.

It was evident from the above data that coated abrasive Examples 1-7 according to the present invention performed very similarly to the Ekamant EKM Antistatex product. In addition, coated abrasive Examples 1-7 loaded significantly less than the control Imperial coated abrasive.

EXAMPLE 8-9

The coated abrasive made according to the procedure outlined in Examples 8 and 9 illustrate the invention on a cloth-type backing.

EXAMPLE 8

A ferric chloride solution was prepared by mixing 10% anhydrous ferric chloride and 90% ethanol. A pyrrole solution was prepared of 10% pyrrole, 20% toluene and 70% hexane. These solutions were sprayed simultaneously in a 1 to 1 weight ratio onto a grade P120 Three-M-ite Resin Bond J weight cloth backed coated abrasive belt commercially available from the 3M Company, St. Paul, Minn. The pyrrole polymerized at room temperature forming doped conjugated polymer. Approximately 2.2 grams/square meter of ferric chloride and pyrrole were added to the coated abrasive. After coating, the coated abrasive was subjected to the Surface Resistivity Test and the Wood Belt Test. Test results can be found in Table II.

EXAMPLE 9

A coated abrasive was prepared and tested in the same manner as Example 8 except that the coating weight was 3.5 grams/square meter.

TABLE II

| Example | Surface Resistivity (K ohm at 1.3 cm) | Belt Loading (grams) |
| --- | --- | --- |
| Control D[4] | >20,000 | 1.3 |
| 8 | 2-5 | 0.5 |
| 9 | 2-5 | 0.5 |

[4]Control D was a grade P120 resin bond J weight cloth backed coated abrasive product commercially available under the tradename Three-M-ite ® from the 3M Company, St. Paul, Minnesota.

It was evident from the above data that the addition of the doped polypyrrole coating significantly reduced belt loading.

EXAMPLES 10-11

The coated abrasives made according to the procedure outlined in Examples 10 and 11 demonstrate the invention on a film-type backing.

EXAMPLE 10

A coated abrasive was prepared and tested in the same manner as Example 8 except that the ferric chloride and pyrrole solutions were sprayed onto a grade P120 Three-M-ite Resin Bond Open Coat film, Type 5, coated abrasive belt (commercially available from the 3M Company, St. Paul, Minn.), with a coating weight of 2.3 grams/square meter. The results are listed in Table III.

EXAMPLE 11

A coated abrasive was prepared and tested in the same manner as Example 10 except that the coating weight was 5.1 grams/square meter.

TABLE III

| Example | Surface Resistivity (K ohm at 1.3 cm) | Belt Loading (grams) |
| --- | --- | --- |
| Control E[5] | >20,000 | 0.7 |
| 10 | 5-10 | 0.4 |
| 11 | 5-10 | 0.3 |

[5]Control E was a grade P120 open coat film backed coated abrasive belt commercially available under the tradename Three-M-ite Resin Bond Type 5 from the 3M Company, St. Paul, Minnesota.

It was concluded from the above data that the conductive, doped, conjugated polymer performed as an antistatic coating on film-backed abrasive products.

EXAMPLES 12-15

Examples 12 through 15 compare different resistivities of various conductive, doped, conjugated polymers measured on the coated abrasive surface.

EXAMPLE 12

A ferric chloride solution was prepared by mixing 10% anhydrous ferric chloride and 90% ethanol. Then this solution was applied to a grade 220 Production RN A weight paper backed open coat coated, abrasive product, commercially available from the 3M Company, St. Paul, Minn. After drying at ambient room temperature for 0.5 hour, a 10% pyrrole type monomer, 70% hexane and 20% toluene solution was sprayed over the ferric chloride. The pyrrole rapidly polymerized into a thin solid coating of doped, conjugated polymer. The coating weights of the doped, conjugated polymer and surface resistivity measurements can be found in Table IV.

EXAMPLE 13

Example 13 was prepared and tested in the same manner as Example 12 except the pyrrole was replaced with N-methyl pyrrole.

EXAMPLE 14

Example 14 was prepared and tested in the same manner as Example 12 except the pyrrole was replaced with a 50/50 blend of pyrrole and N-methyl pyrrole.

TABLE IV

| Example | Coating Weight (gms/sq. meter) | Surface Resistivity (K ohm at 1.3 cm) |
| --- | --- | --- |
| Control F[6] | — | >20,000 |
| 12 | 4.9 | 20–30 |
| 13 | 3.8 | 2,400–2,800 |
| 14 | 3.3 | 150–250 |

[6]Control F was a grade 220 A weight paper backed coated abrasive product commercially available under the trade name Production RN from the 3M Company, St. Paul Minnesota.

It was observed from the above data, that polypyrrole was more conductive than poly(N-methyl pyrrole), however poly(N-methyl pyrrole) was still an improvement over the commercially available product without the conductive supersize coating.

EXAMPLE 15

A 5% aqueous solution of ammonium persulfate, $[(NH_4)_2S_2O_8]$, a strong anionic oxidant, was applied to the abrasive surface of a grade 220 coated abrasive having an open coat on A weight paper backing. The coating was air dried at ambient room temperature for 0.5 hour. Next a 5% aniline, 10% concentrated hydrochloric acid, and 85% methanol solution was applied over the ammonium persulfate. The aniline polymerized into polyaniline and formed a conductive, doped, conjugated polymer. The surface resistivity was measured in the same manner as the above examples except that the ohmmeter was a Fluke, Model 8020B. The coating weights of the conductive, doped, conjugated polymer and surface resistivity measurements can be found in Table V.

TABLE V

| Example | Coating Weight (gm/sq. meter) | Surface Resistivity (K ohm at 1.3 cm) |
| --- | --- | --- |
| Control G[7] | — | >20,000 |
| 15 | 3.1 | 15–100 |

[7]Control G was a grade 220 open coat A weight paper backed coated abrasive product commercially available from the 3M Company, St. Paul, Minnesota.

It was concluded from the above data that the doped polyaniline coated as a supersize significantly reduced the surface resistivity of the coated abrasive product; thus the conductivity was increased.

EXAMPLES 16–25

Examples 16–25 demonstrate various other embodiments of the invention. The coated abrasive employed in each example was a grade P120 Imperial Resin Bond F weight paper coated abrasive belt, commercially available from 3M Company, St. Paul, Minn. The test results can be found in Table VI. The resulting coated abrasive belts were tested on the Wood Belt Test and the surface resistivity was measured. In addition, the total cut, i.e., the amount of wood removed by the coated abrasive, and a measure of the static electricity were also recorded. The static electricity was measured with a hand held static meter placed about 5 cm from the coated abrasive surface. The static meter was obtained from 3M Company, St. Paul, Minn., as static meter number 703.

EXAMPLE 16

A ferric chloride solution was prepared by mixing 10% anhydrous ferric chloride and 90% ethanol. This solution was then applied to the abrasive side of the coated abrasive. A solution of 10% pyrrole, 20% toluene and 70% hexane was sprayed over the dried ferric chloride coating, which resulted in the polymerization of the pyrrole to form a thin, solid coating of conductive, doped, conjugated polymer. The weight ratio of the two solutions was one to one, with approximately 3.2 grams/square meter of conductive, doped, conjugated polypyrrole being added to the coated abrasive.

EXAMPLE 17

The coated abrasive for Example 17 was prepared in the same manner as Example 16 except that an additional coating of a urea-formaldehyde resin was sprayed over the chloride doped polypyrrole. The urea-formaldehyde solution consisted of a 20% solids aqueous solution of Varcuum 4048 urea-formaldehyde resin (diluted from the 65% solids as available from Reichhold Chemical Company) with a 0.5% aluminum chloride catalyst added. The urea-formaldehyde resin was cured in an oven at 70° C. for 60 minutes. The coating weight of the urea-formaldehyde resin was 10.5 grams/square meter.

EXAMPLE 18

The coated abrasive for Example 18 was prepared in the same manner as Example 16 except that an additional coating of a metal stearate was applied over the chloride doped polypyrrole. The metal stearate was applied as a 23% solids aqueous dispersion, and the dried coating weight was 17.5 grams/square meter.

EXAMPLE 19

A ferric chloride solution was prepared by mixing 10% anhydrous ferric chloride and 90% ethanol. This solution was then applied to the abrasive side of the coated abrasive. A solution of 10% bithiophene and 90% toluene was prepared and sprayed over the ferric chloride which resulted in the polymerization of the bithiophene to form a thin, solid coating of a conductive, doped, conjugated polymer. The weight ratio of ferric chloride to bithiophene was one to one, and the coating weight of the doped polythiophene was 4.0 grams/square meter.

EXAMPLE 20

The coated abrasive for Example 20 was prepared in the same manner as Example 19, except the ferric chloride was replaced with a ferric p-toluenesulfonate solution, 20% solids solution in ethanol. The weight ratio of ferric p-toluenesulfonate/bithiophene was one to one. The coating weight of the p-toluenesulfonate doped polythiophene was 15.6 grams/square meter.

EXAMPLE 21

A 10% pyrrole, 20% toluene and 70% hexane solution was sprayed on the abrasive surface of the coated abrasive. Next, a 20% solids solution of ferric p-toluenesulfonate in ethanol was applied over the pyrrole solution, which resulted in the polymerization of the pyrrole to form a thin, solid coating of a conductive, doped, conjugated polymer. The weight ratio of pyrrole to ferric p-toluenesulfonate was one to one and the coating weight was 6.6 grams/square meter.

EXAMPLE 22

The coated abrasive for Example 22 was prepared in the same manner as Example 21 except the ferric p-toluenesulfonate was replaced with ferric dodecylbenzenesulfonate (FDBS) and the FDBS ethanol solution was 25% solids. The weight ratio of FDBS to bithiophene was one to one and the coating weight of the dodecylbenzenesulfonate (DBS) doped polypyrrole was 7.0 grams/square meter.

EXAMPLE 23

The coated abrasive for Example 23 was prepared in the same manner as Example 22 except that an additional coating of a urea-formaldehyde resin was sprayed over the DBS doped polypyrrole. The urea-formaldehyde solution consisted of 20% urea-formaldehyde solids in aqueous solution (obtained by diluting Varcuum 4048 available from Reichhold Chemical Company) and adding 0.5% by weight aluminum chloride catalyst. The urea-formaldehyde resin was cured in an oven at 70° C. for 60 minutes. The coating weight of the urea-formaldehyde resin was 9.5 grams/square meter.

EXAMPLE 24

The coated abrasive for Example 24 was prepared in the same manner as Example 22 except that an additional coating of a metal stearate solution was applied over the DBS doped polypyrrole. The metal stearate aqueous dispersion was 23% solids and the coating weight was 10.3 grams/square meter.

EXAMPLE 25

An aniline solution that consisted of 5% aniline, 10% concentrated hydrochloric acid and 85% methanol was sprayed on the abrasive side of the coated abrasive. Then an ammonium persulfate solution that consisted of 10% ammonium persulfate, 90% water and 0.5% wetting agent, FC-170 commercially available from the 3M Company, was sprayed over the aniline coating. This resulted in the polymerization of the aniline to form a thin, solid coating of a conductive, doped, conjugated polymer. The weight ratio of aniline to ammonium persulfate was one to one and the coating weight of the sulfate doped polyaniline was 9.9 grams/square meter.

TABLE VI

| Example Number | Resistivity (K ohm at 1.3 cm) | Cut (grams) | Static Meter Reading (volts) |
|---|---|---|---|
| 16 | <20 | 580 | −4080 |
| 17 | <35 | 600 | −4290 |
| 18 | <35 | 715 | −1167 |
| 19 | <45 | 562 | −3687 |
| 20 | <30 | 615 | −4375 |
| 21 | <10 | 584 | −4500 |
| 22 | <30 | 537 | <−5000 |
| 23 | <30 | 560 | −3270 |
| 24 | <25 | 602 | −4460 |
| 25 | <10 | 660 | −2834 |
| Control A | >20,000 | 627 | +2500 |

Control A was made P120 Imperial Resin Bond F weight paper coated abrasive belt, commercially available from 3M Company, St. Paul, Minn.

EXAMPLES 26–30

Belts made with sample coated abrasives of Examples 26–38 in accordance with the present invention were tested on the Stroke Sander Test I and the surface resistivity was measured. The results of these operations can be found in Table VII.

EXAMPLE 26

The coat side of a grade P120 "Imperial" F weight, open coat coated abrasive commercially available from the 3M Company of St. Paul, Minn., was simultaneously sprayed with a solution of ferric chloride and a solution of pyrrole in approximately a one to one ratio. The ferric chloride solution (hereafter "Ferric Chloride Solution") consisted of by weight 10% anhydrous ferric chloride, 90% anhydrous ethyl alcohol; while the pyrrole solution (hereafter "Pyrrole Solution") consisted of by weight 10% pyrrole, 20% toluene and 70% hexane.

EXAMPLE 27

The coated abrasive for Example 27 was made and tested in the same manner as Example 26 except that over the conductive polymer was applied a 23% solids aqueous dispersion of zinc stearate which resulted in a dry coating weight of 14.7 grams/square meter.

EXAMPLE 28

This coated abrasive was made and tested in the same manner as Example 26 except that the conductive polymer was applied to the backsize of the abrasive article.

EXAMPLE 29

This coated abrasive was made and tested in the same manner as Example 28 except that over the conductive polymer was applied a 23% solids aqueous dispersion of zinc stearate which resulted in a dry coating weight of 6.7 grams/square meter.

TABLE VII

| Example | Weight of the Conductive Polymer (g/m$^2$) | Surface Resistivity (K ohm/1.3 cm) | Total Cut (grams) |
|---|---|---|---|
| 26 | 3.8 | 5 to 10 | 837 |
| 27 | 2.5 | 5 to 10 | 1071 |
| 28 | 3.8 | 20 to 100 | 976 |
| 29 | 3.4 | 20 to 100 | 1049 |
| Control B | — | >20,000 | 918 |

It was noted for Examples 26 to 29 that, during abrading, the resulting dust was extracted through the normal exhaust means. For Control Example B, however, which was not conductive, the dust generated during abrading was not removed by the normal exhaust means, but rather lingered at the grinding interface suspended in the air.

EXAMPLES 30–39

The coated abrasive materials made according to Examples 30–39 were measured for surface resistivity and tested according to Stroke Sander Test II. The test results can be found in Table IX.

EXAMPLE 30

The adhesive surface of a grade P150 "Imperial" F weight, open coat coated abrasive which was commercially available from the 3M Company of St. Paul, Minn., was simultaneously sprayed with the Ferric Chloride Solution and the Pyrrole Solution in approximately a one to one ratio resulting in a conductive doped conjugated polymer coating weight of 1.2 gram/square meter.

EXAMPLE 31

The coated abrasive for Example 31 was made in the same manner as Example 30 except that the coating weight of the conductive doped conjugated polymer was 2.6 grams/square meter.

EXAMPLE 32

The coated abrasive for Example 30 was made in the same manner as Example 32 except that the starting coated abrasive material was a grade P150 F weight paper, closed coat product which was commercially available from the 3M Company of St. Paul, Minn. under the trade designation grade P150 "Imperial" closed coat, and the coating weight of the conductive doped conjugated polymer was 1.6 gram/square meter. Also, over the abrasive surface was applied a zinc stearate coating at a weight of 10.9 grams/square meter.

EXAMPLE 33

This coated abrasive was made in the same manner as Example 32 except that the coating weight of the zinc stearate was 11.3 grams/square meter.

EXAMPLE 34

This coated abrasive was made in the same manner as Example 30 except that the conductive polymer was applied to the backside of the coated abrasive.

EXAMPLE 35

This coated abrasive was made in the same manner as Example 34 except a 21 grams/square meter coating of zinc stearate was applied over the abrasive grains.

EXAMPLE 36

This back side of a grade P150 F weight, closed coat coated abrasive which is commercially available from the 3M Company of St. Paul, Minn. under the trade designation grade P150 "Imperial" closed coat, was simultaneously sprayed with the Ferric Chloride solution and the Pyrrole Solution in approximately a one to one ratio, resulting in a conductive doped conjugated polymer coating weight of 2.6 grams/square meter. In addition, over the abrasive grains was applied a 25 grams/square meter zinc stearate coating.

EXAMPLE 37

This coated abrasive was made in the same manner as Example 36 except that an additional backsize coating was applied over the conductive polymer. This additional backsize coating was a 70/30 weight blend of epoxy resin available under the trade designation "Epon" 871 from Shell and polyamide curing agent available under the trade designation "Versamid" 125 from Henkel Corporation which had a coating weight of 18.4 grams/square meter. Also, the zinc stearate coating weight was 13.4 grams/square meter.

EXAMPLE 38

This coated abrasive was made in the same manner as Example 37 except that the zinc stearate coating weight was 13.8 grams/square meter.

EXAMPLE 39

An acrylic latex was coated on an F weight paper and then dried to seal the paper. Next, a solution of ferric toscylate and Pyrrole Solution in approximately a one to one ratio were sprayed over the acrylic latex coating. The ferric toscylate solution consisted of by weight 20% ferric toscylate, 80% anhydrous ethyl alcohol. The resulting conductive, doped, conjugated polymer coating weight was 4.2 grams/square meter. Next, a resole phenolic make resin was coated over the conductive polymer and immediately thereafter grade P150 aluminum oxide abrasive grains were electrostatically projected into the make resin. This was precured for 90 minutes at 88° C. Next, a resole phenolic size resin was coated over the abrasive grains and the abrasive article was fully cured for 10 hours at 100° C. Then a zinc stearate coating, at a weight of 14.4 grams/square meter, was applied over the size coat. The coating weights for the make coat, size coat and abrasive grains were 33.5, 117 and 117 grams/square meter, respectively.

TABLE IX

| Example | Surface Resistivity (K ohms at 1.3 cm) | Saw Dust Accumulation (grams) |
|---|---|---|
| 30 | <20 | 1.3 |
| 31 | <10 | 0.3 |
| 32 | <5 | 0.2 |
| 33 | <10 | 0.3 |
| 34 | 80 to 150 | 0.9 |
| 35 | 35 to 60 | 0.7 |
| 36 | 15 to 35 | 0.7 |
| 37 | 10 to 15 | 0.4 |
| 38 | | 0.2 |
| 39 | | 0.9 |
| Control H | 20-30 | 0.4 |
| Control I | >20,000 | 13.9 |
| Control J | >20,000 | 11.6 |
| Control K | >20,000 | 11.7 |
| Control L | >20,000 | 12.4 |
| Control M | >20,000 | 26.1 |

Control H was a grade P150 coated abrasive which is available from Ekamant under the trade designation EKM Antistatex. This product is considered in the art to be an antistatic coated abrasive product.

Control I was a grade P150 F weight paper, open coat coated abrasive commercially available from 3M Company, St. Paul, Minn. under the trade designation grade P150 "Imperial" open coat.

Control J was a grade P150 F weight paper, closed coat coated abrasive commercially available from 3M Company, St. Paul, Minn. under the trade designation grade P150 "Imperial" open coat.

Control K was a grade P150 F weight paper, open coat coated abrasive commercially available from 3M Company, St. Paul, Minn. under the trade designation grade P150 "Imperial" open coat which had an additional coating of zinc stearate at a weight of 21 grams/square meter.

Control L was a grade P150 F weight paper, closed coat coated abrasive commercially available from 3M Company, St. Paul, Minn. under the trade designation grade P150 "Imperial" open coat which had an additional coating of zinc stearate at a weight of 25 grams/square meter.

Control M was made in the same manner as Example 39 except that it did not contain the conductive polymer and the coating weights for the make coat, size coat, abrasive grains and zinc stearate were 28.1, 49.9, 122 and 7.3 grams/square meter, respectively.

For Examples 38 and 39 the surface resistivity could not be measured accurately with the present ohmmeter since the conductive polymer was buried underneath an insulating resin layer.

It can be seen from Table IX that the addition of the conductive polymer to a coated abrasive construction, according to the present invention significantly reduced the dust accumulation.

We claim:

1. An improved abrasive article comprising:
   (a) a support member having a front surface and a back surface;
   (b) abrasive granules;
   (c) a bond system which serves to secure the abrasive granules to the front surface of the support member in an abrasive coating having an abrasive surface;
   the improvement comprising a conductive, doped, conjugated polymer layer over at least one of said abrasive surface, said front surface or said back surface, said polymer being contained in said layer in an amount sufficient to reduce static electrical charge resulting abrading operations, provided if the polymer of said conductive, doped, conjugated, polymer layer is acidic the support member surface upon which it may be applied is selected so that it will not be degraded by the presence of acid.

2. The abrasive article according to claim 1, wherein said conductive, doped, conjugated polymer is selected from the group consisting of polythiophene, polyaniline, polypyrrole, polyacetylene, poly(p-phenylene), poly(p-phenylenevinylene), poly(p-phenylene sulfide), polyfuran, polycarbazole, polyisothianaphthene, polyquinoline, polyazulene, polyisoindole, copolymers, and mixtures thereof.

3. The abrasive article according to claim 1, wherein said conjugated polymer is polypyrrole, polyaniline and copolymers thereof.

4. The abrasive article according to claim 2, wherein said doped, conjugated polymer is doped with a dopant selected from the group consisting of bisulfate, sulfate, perchlorate, fluoroborate, hexafluorophosphate, hexafluoroantimonate, hexafluoroarsenate, trifluoroacetate, organic sulfonates, halides, and ferric tetrachloride.

5. The abrasive article according to claim 3, wherein said doped, conjugated polymer is doped with a dopant selected from the group consisting of chloride, ferric tetrachloride, sulfate and p-toluene sulfonate.

6. The abrasive article of claim 1 wherein said support member is a sheet and said abrasive article is a coated abrasive article.

7. The abrasive article of claim 1 wherein said conductive, doped, conjugated polymer layer is the outermost layer.

8. The abrasive article of claim 1 wherein said conductive, doped, conjugated polymer layer is beneath the free coating layer.

9. The abrasive article of claim 1 wherein said free coating layer is a layer of a material selected from the group consisting of urea-formaldehyde resins, melamine-formaldehyde resins, phenolic resins, epoxy resins, and metal stearate.

10. The abrasive article of claim 9 wherein said free coating comprises a metal stearate.

11. A method of improving an abrasive article which comprises a support member having a front surface and a back surface, abrasive granules, and a bond system which serves to secure the abrasive granules to the front surface of the support member in an abrasive coating; the method comprising applying a conductive, doped, conjugated, polymer layer over at least one of said abrasive surface, said front surface or said back surface in an amount sufficient to reduce static electrical charge resulting from abrading operations, provided if the polymer of said conductive, doped, conjugated polymer layer is acidic, the support member surface upon which it may be applied is selected so that it will not be degraded in the presence of acid.

12. The method of claim 11 wherein said conductive, doped, conjugated polymer layer is formed by simultaneously applying solutions of monomer selected from pyrrole and aniline, and a solution of redox agent to the surface of said abrasive coating and permitting the solvent to dry forming said conductive, doped, conjugated, polymer layer.

13. The abrasive article of claim 1 wherein said conductive, doped, conjugated polymer layer is on the back side of said support member.

* * * * *

UNITED STATES PATENT AND TRADEMARK OFFICE
CERTIFICATE OF CORRECTION

PATENT NO.   : 5,061,294

DATED        : October 29, 1991

INVENTOR(S)  : HARMER, ET AL.

It is certified that error appears in the above-identified patent and that said Letters Patent is hereby corrected as shown below:

On the cover page under cited references, "Vanden Berg et al" should read --van den Berg, et al--, "Lumey et al" should read --Tumey et al--, and "Shakier" should read --Thakur--.

Col. 2, line 42 "to" should read --of--.

Col. 8, line 9, "standing" should read --sanding--.

Signed and Sealed this

Sixth Day of April, 1993

Attest:

STEPHEN G. KUNIN

*Attesting Officer*    Acting Commissioner of Patents and Trademarks